United States Patent [19]

Greenlee, III

[11] Patent Number: 4,565,283
[45] Date of Patent: Jan. 21, 1986

[54] MEANS AND PROCESS FOR EXTRACTING POWER FROM A PASSING CABLE

[75] Inventor: Fred S. Greenlee, III, Wichita, Kans.

[73] Assignee: Great Plains Ventures, Wichita, Kans.

[21] Appl. No.: 593,680

[22] Filed: Mar. 26, 1984

[51] Int. Cl.$^4$ .............................................. B65G 13/07
[52] U.S. Cl. ..................................... 198/790; 198/601; 464/55; 474/61
[58] Field of Search ..................... 198/790; 474/61, 62, 474/63, 88; 464/55, 185; 198/601, 780, 781

[56] References Cited

U.S. PATENT DOCUMENTS

| | | | |
|---|---|---|---|
| 835,590 | 11/1906 | Whiteford | 198/601 |
| 1,825,038 | 9/1931 | Anderson | 198/790 X |
| 3,840,110 | 10/1974 | Molt et al. | 198/781 |
| 4,264,002 | 4/1981 | Van Der Schie | 198/790 X |
| 4,319,675 | 3/1982 | Turnbough | 198/790 X |
| 4,355,715 | 10/1982 | Chorlton | 198/790 X |
| 4,372,442 | 2/1983 | Fleischauer | 198/790 |
| 4,485,913 | 12/1984 | Treiber | 198/790 |

*Primary Examiner*—Robert J. Spar
*Assistant Examiner*—Jonathan D. Holmes
*Attorney, Agent, or Firm*—Edwin H. Crabtree

[57] ABSTRACT

A conveyor system having transfer rollers for transferring articles from a conveyor to a branch conveyor having a plurality of rotatable branch sheaves. The conveyor having a plurality of carrier rollers rotatably connected to a pair of support members and a conveyor drive cable mechanically communicating with the branch conveyor. The conveyor including a plurality of idle sheaves rotatably connected to the support members and the carrier rollers and an endless cable positioned over the idle sheaves and branch sheaves and engaged to a cable drive.

11 Claims, 5 Drawing Figures

FIG. 3 (CONTD.)

MEANS AND PROCESS FOR EXTRACTING POWER FROM A PASSING CABLE

BACKGROUND OF THE INVENTION

1. Field of the Invention

This invention provides an improved combination of a conveyor system and a transferring conveyor system for transferring articles from the conveyor system to a branch conveyor system. More specifically, this invention contemplates a novel means for extracting rotary power from a passing cable and transmitting this rotary power to a transferring conveying system within a conyeyor system.

2. Description of the Prior Art

U.S. Pat. No. 4,319,675 by Turnbough teaches a cable driven transferred conveyor wherein the cable that drives the main conveyor, or which may be driven thereby, is used to drive the transfer conveyor. U.S. Pat. No. 4,096,942 by Shepherd teaches conveyors operated by the power from a cable wherein the conveyor may be driven by the cable operated at an angle so that the conveyor may allow articles to be moved through a corner such as a 90° turn, or transferred and driven by another conveyor. U.S. Pat. No. 3,610,404 by Fleischauer, et al discloses a curved roller conveyor wherein a driven shaft has cables attached thereto and engaging selected ones of the rollers to provide power to the same for moving an article carried thereon. U.S. Pat. No. 3,643,789 by Werntz discloses a belt-driven roller conveyor having eccentric brackets distributed along the length of the conveyor to provide local drive variations of power applied to the rollers. Also, U.S. Pat. No. 4,198,833 by Fleischauer, et al, discloses a controlled slippage conveyor wherein a shaft drives a plurality of cables engaged to the rollers to provide a variable drive between the input shaft and the rollers themselves. None of the foregoing prior art teach or suggest the means and process for extracting rotary power from a passing cable of this invention.

SUMMARY OF THE INVENTION

This invention accomplishes its desired objects by providing an improved combination of a conveyor system and a conveyor system having transferring roller means transferring articles from the conveyor system to a branch conveyor system having a plurality of rotatable branch sheaves. The conveyor system is of the type having a plurality of carrier rollers rotatably connected to a pair of support members and a conveyor cable drive means mechanically communicating with the branch conveyor system. The conveyor system includes a plurality of idle sheaves rotatably connected underneath the carrier rollers and an endless cable positioned over a plurality of idle sheaves and branch sheaves and engaged to the conveyor cable drive means. The improvement comprises at least two guide sheaves means rotatably secured within the conveyor system in general proximity to each other and essentially on the same plane; and at least one take-off sheave means rotatably positioned within the conveyor system between the two guide sheaves means and essentially on the same plane as the two guide sheaves means such that when the endless cable movably passes between the two guide sheaves means and the take-off sheave means, the take-off sheave means essentially detours the generally straight-lined path of the endless cable to frictionally pinch the cable in order that the rotational power is imparted to take-off sheave. At least one drive sheave is concentrically integrally bound to the at least one take-off sheave, such that the drive sheave rotate in unison. The improvement further comprises a drive shaft means rotatably positioned within the conveyor system underneath the transferring conveyor system; and at least one power take-off endless belt interengaging the at least one drive sheave means and the drive shaft means to transmit rotary power from the drive sheave means to the drive shaft means. The improvement further finally comprises at least one accessory endless belt inter-connecting at least one of the transferring roller means of the transferring conveyor system and the drive shaft means to transmit rotary power from the drive shaft means to the transferring roller means of the transferring conveyor system.

This invention also accomplishes its desired objects by providing a novel process for transferring articles to the branch conveyor system from the combined transferring system and conveyor system, comprising the steps of detouring the generally straight-line path of the endless cable by movably passing the endless cable between at least one pair of guide sheave means and a take-off sheave means positioned therebetween to frictionally pinch the endless cable in order that the rotational power is imparted to the take-off sheave means; and rotating concentrically in unison at least one drive sheave means, such that the rotary power imparted to the take-off sheave means is simultaneously imparted to the drive sheave means. The process additionally comprises positioning rotatably a drive shaft means within the conveyor system underneath the transferring conveyor system; extracting power from the rotating drive sheave means and imparting the same to the drive shaft means in order to rotate the drive shaft means; and transmitting rotational power from the rotating drive shaft means to the transferring roller means of the transferring conveyor system.

It is an obejct of the invention to provide a novel combination of a conveyor system and a transferring conveyor system which is capable of easily being assembled and disassembled.

Still further objects of the invention reside in the provision of a process for transferring articles to a branch conveyor system from a combined transferring system and conveyor system and an improved combination of the conveyor system and the transferring conveyor system, which can be easily operated, and is relatively inexpensive to manufacture.

These together, with the various ancillary objects and features, will become apparent as the following description proceeds, are attained by this invention, preferred embodiments being shown in the accompanying drawings, by way of example only, wherein:

DETAILED DESCRIPTION OF THE INVENTION

Figure 1:
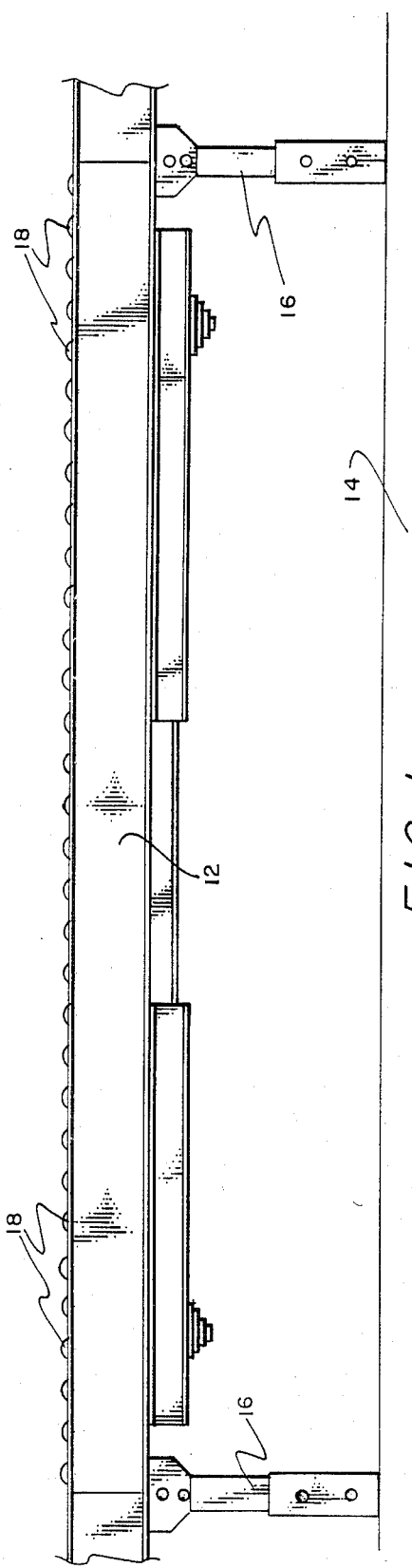
FIG. 1 is a partial side elevational view of the combined transferring conveyor system and the conveyor system.
Figure 2:
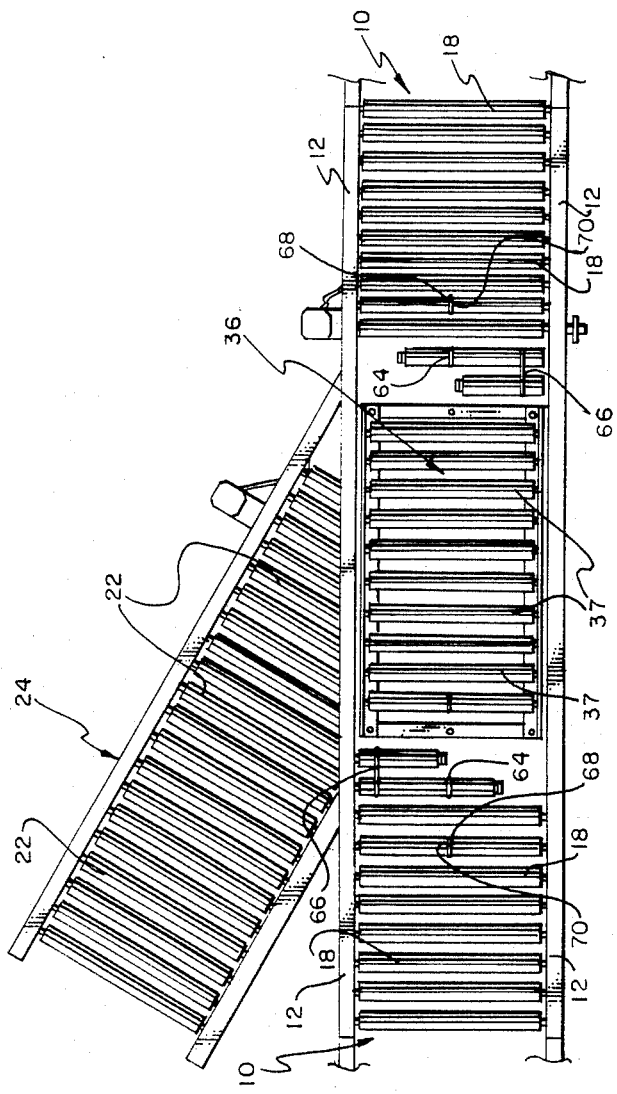
FIG. 2 is a top plan view of the combined conveyor system—transferring conveyor system and the branch conveyor system attached thereto.

Referring in detail now to the drawings wherein similar parts of the invention are identified by like reference numerals, a cable drive conveyor sytem, generally illustrated as 10, has a pair of support members 12—12 generally equidistantly separated from each other throughout their lengths while traversing a base floor 14. A plurality of pairs of supports 16—16 attach to the pair of suppott members 12—12 for supporting and positioning the conveyor system 10 at a desired height from the base floor 14. A plurality of carrier rollers 18 rotatably connect to the support members 12—12 for rotatably supporting and carrying articles. A plurality of idle sheaves 20 rotatably connect underneath the carrier rollers 18 of the conveyor system 10, and branch sheaves 21 rotatably attach underneath a plurality of carrier rollers 22 of a branch conveyor system, generally illustrated as 24, angularly disposed with respect to the conveyor system 10. An endless cable 26 is positioned over the plurality of idle sheaves 20 and branch sheaves 21 and is engaged to a conveyor cable drive means, not shown in the drawings but well known to those possessing ordinary skills in the art. Two pairs of guide sheaves 28—28 (see FIG. 3) are rotatively secured within the conveyor system 10 in general proximity to each other and essentially on the same horizontal plane with respect to the base floor 14. Take-off sheave 30 is rotatively positioned within the conveyor system 10 between the two pairs of guide sheaves 28—28 and is also essentially on the same horizontal plane as the guide sheaves 28—28 such that when the endless cable 26 movably passes between the guide sheaves 28—28 and the take-off sheave 30 (see FIG. 3), the take-off sheave 30 essentially detours the generally straight-line path of the endless cable 26 to frictionally pinch the cable 26 in order that rotational power is imparted to the take-off sheave 30.

Drive sheave 32 is concentrically integrally bound to take-off sheave 30 such that the drive sheave 32 and the take-off sheave 30 rotate in unison. A drive shaft 34 is rotatively positioned within the conveyor system 10 underneath a transferring conveyor system, generally illustrated as 36, having rotatably positioned transferring rollers 37.

Figure 5:
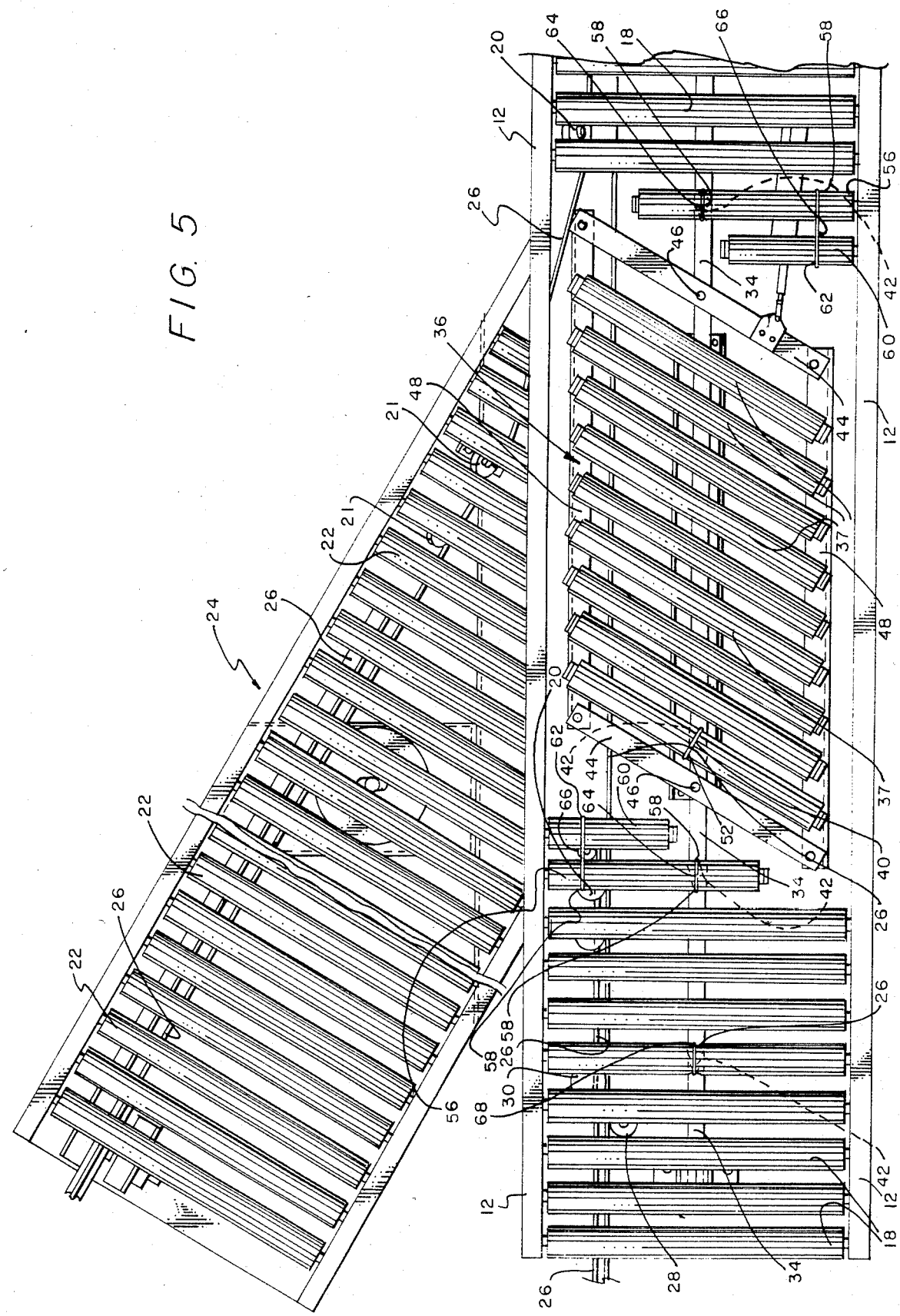
FIG. 5 is an enlarged top plan view of the combined transferring conveyor system—conveyor system and the angularly disposed branch conveyor system and depicting the transferring conveyor system pivoted such as to convey articles off of the conveyor system and onto the branch conveyor system.

Power take-off endless belt 38 interengages the drive sheaves 32 and the drive shaft 34 in order to transmit rotary power from the drive sheave 32 to the drive shaft 34. Accessory endless belts 40 interconnects at least one of the transferring rollers 37 (see FIG. 5) of the transferring conveyor system 36 and the drive shaft 34 in order to transmit rotary power from the drive shaft 34 to the transferring roller 37 of the transferring conveyor system 36.

The drive shaft 34 has a structure defining a plurality of grooves 42. The power take-off endless belt 38 movably passes around one of the grooves 42 of the drive shaft 34.

Figure 3:
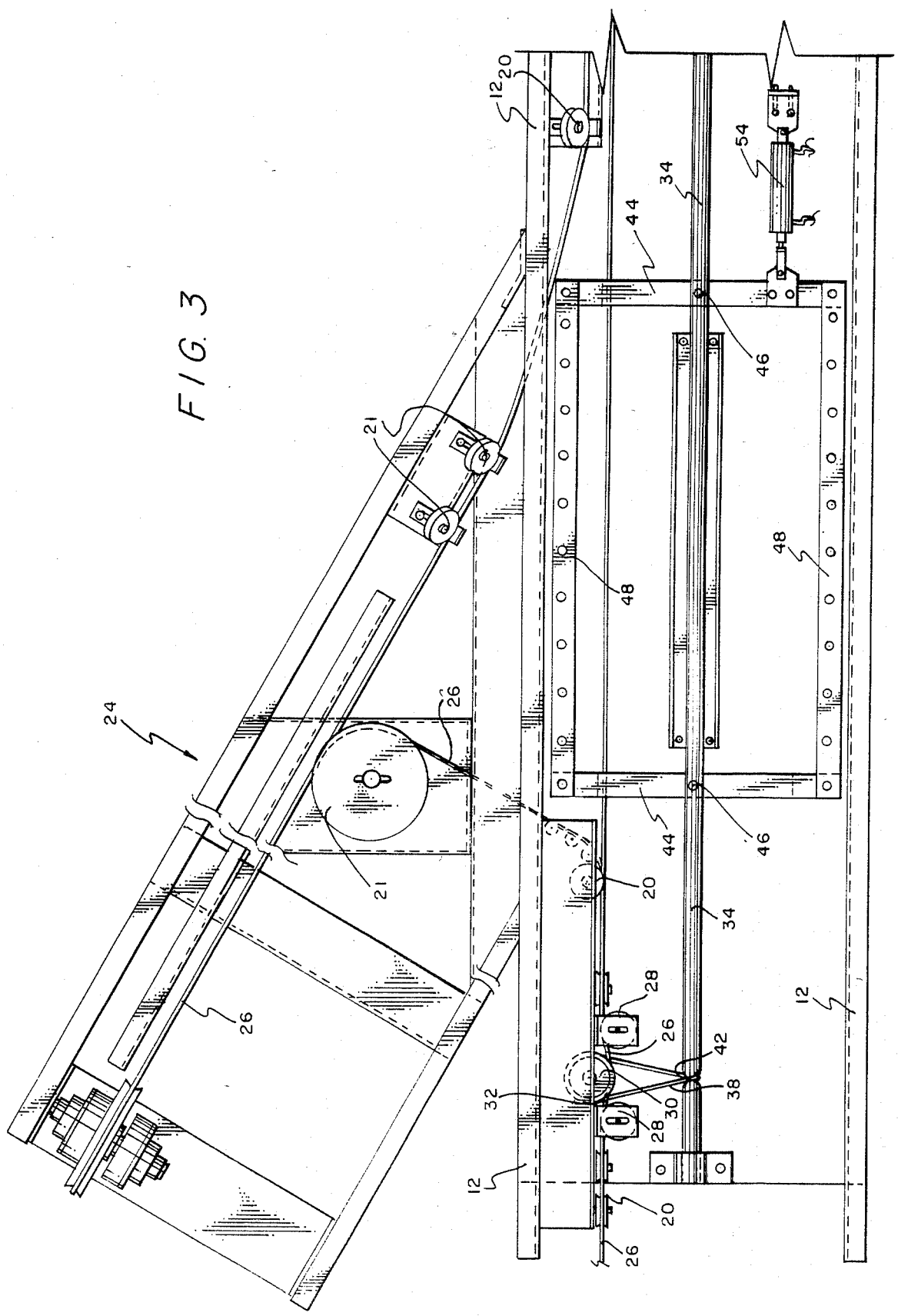
FIG. 3 is a partial horizontal sectional view taken in the direction of the arrows and along the plane of line 3—3 in FIG. 4.
Figure 4:
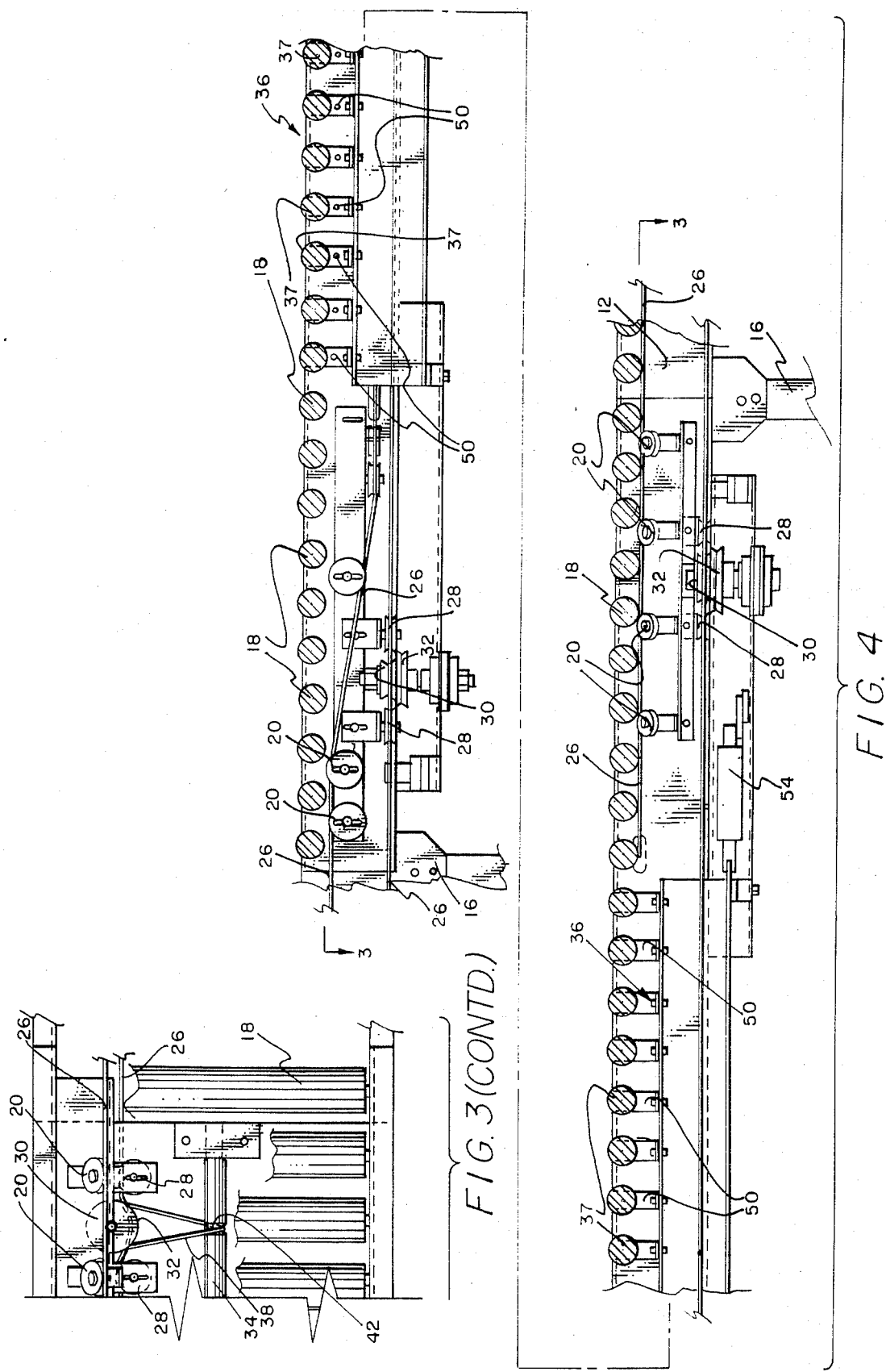
FIG. 4 is a vertical sectional view of the combined transferring conveyor system and the conveyor system.

The transferring conveyor system 36 comprises a pair of opposed pivot bars 44—44 pivotably secured at 46 within the conveyor system 10 at their mid-points (see FIG. 3). A pair of opposed side supports 48—48 is pivotably connected to the ends of the pair of pivot bars 44—44, and a plurality of pairs of opposed roller brackets 50—50 is aligned along the pair of opposed side supports 48—48. The transferring rollers 37 are rotatively connected to the plurality of pairs of opposed roller brackets 50—50. As was previously mentioned, at least one of the transferring rollers 37 interconnects to the accessory endless belts 40 and has a structure defining an accessory groove 52 (see FIG. 5) wherein the accessory endless belt 40 movably passes around. An air cylinder 54 is attached within the conveyor system 10 in proximity to one of the ends of one of the pivot bars 44 in order to pivot the attached pivot bar 44 about its pivotably secured midpoint 46, such that the opposed pair of pivot bars 44—44 and the opposed pair of side supports 48—48 pivotably connected to the opposed pair of pivot bars 44—44, define a parallelogram.

Double-grooved rollers 56 having a pair of grooves 58—58 are rotatively secured at one of their ends to one of the support members 12 in proximity to one of the pivot bars 44. Short rollers 60 include a single groove 62 and have one of their ends rotatively secured to one of the support members 12 between the double grooved roller 56 and the pivot bar 44. The drive shaft 34 has a groove 42 situated underneath one of the grooves 58 of the double-grooved rollers 56 and a roller endless belt 64 interengages around the groove 58 of the double-grooved roller 56 and the groove 42 of the drive shaft 34 situated underneath thereof, in order that rotary power can be extracted from the drive shaft 34 and transmitted to the double-grooved roller 56.

Short endless belts 66 interengage around the single groove 62 of each of the short rollers 60 and each of the vacant grooves 58 of the double-grooved rollers 56 in order that the rotary power of the double-grooved rollers 56 received from the drive shaft 34 is transmitted to the short roller 60.

At least one of the plurality of carrier rollers 18 of the conveyor system 10, situated over the drive shaft 34, has a structure defining a carrier groove 68. The drive shaft 34 has grooves 42 positioned-under the grooved carrier roller 18. A carrier endless belt 70 interengages around the groove 68 of the carrier roller 18 and the groove 42 of the drive shaft 34 situated underneath thereof in order that rotary power can be extracted from the drive shaft 34 and transmitted to the grooved carrier roller 18.

With continuing reference to the drawings for operation of the invention and the process for transferring articles (by extracting power from a passing cable 26) to the branch conveyor system 24 from the improved combined conveyor system 10-transferring conveyor system 36, the generally straight-line path of the endless cable 26 is detoured or interrupted by movably passing the endless cable 26 between the pair of guide sheaves 28—28 and the take-off sheave 30 positioned between the pair of guide sheaves 28—28 in order to frictionally pinch the endless cable 26 to impart rotational power to the take-off sheave 30. Drive sheave 32 is concentrically bound to the take-off sheave 30 in order to rotate concentrically therewith such that rotary power imparted to the take-off sheave 30 is simultaneously imparted to the drive sheave 32. Belt 38 transmits rotary power from the rotating drive sheave 32 to the drive shaft 34 that is rotatably positioned within the conveyor system 10 underneath the transferring conveyor system 36. Rotational power of the drive shaft 34 is subsequently transmitted to the grooved transferring roller 37 of the transferring conveyor system 36 and to a grooved carrier roller 18 of conveyor system 10 by belts 40 and 68, respectively. At a predetermined time, air cylinder 54 is engaged to pivot pivot bars 44—44 at their mid-point 46 in order to transfer the pivotally combined pivot bars 44—44, side supports 48—48 structure into a parrallelogram (see FIG. 5) which directs articles being conveyed onto the branch conveyor system 24. Drive shaft 34 rotational power is also transmitted to the double grooved rollers 56—56 by belts 64—64 interengaged between the rollers 56—56 and the shaft 34. Rotary power imparted to double grooved rollers 56—56 from the drive shaft 34 is transmitted to the short rollers 60—60 by belt 66. When the predetermined number of articles has been transferred to the branch conveyor system 24, air cylinder 54 is disengaged to return the pivotally combined pivot bars 44—44, side supports 48—48 structure into the rectangle illustrated in FIG. 3.

Various alterations may be made in the foregoing constructions without departing from the spirit of the invention, and it is intended that the drawings and embodiments of the invention are to be merely illustrative.

I claim:

1. In an improved combination of a conveyor system and a transferring conveyor system having transferring roller means for transferring articles from the conveyor system to a branch conveyor system having a plurality of rotatable branch sheaves and the conveyor system being of the type having a plurality of carrier rollers rotatably connected to a pair of support members and a conveyor cable drive means mechanically communicating with the branch conveyor system and the conveyor system including a plurality of idle sheaves rotatably connected to said support members underneath the carrier rollers and an endless cable positioned over the plurality of idle sheaves and branch sheaves and engaged with the conveyor cable drive means, said improvement comprising at least two guide sheave means rotatably secured within the conveyor system in general proximity to each other and essentially in the same plane; at least one take-off sheave means rotatably positioned within the conveyor system between said two guide sheave means and essentially in the same plane of said guide sheave means such that when said endless cable movably passes between the two guide sheave means and the take-off sheave means, the take-off sheave means essentially detours the generally straight-line path of the endless cable to frictionally pinch the cable in order that rotational power is imparted to the take-off sheave; at least one drive sheave means concentrically integrally bound to the at least one take-off sheave such that the drive sheave means and the take-off sheave rotate in unison; a drive shaft means rotatably positioned within the conveyor system underneath said transferring conveyor system; at least one power take-off endless belt interengaging the at least one drive sheave means and the drive shaft means to transmit rotary power from the drive sheave means to the drive shaft means; and at least one accessory endless belt interconnecting at least one of the transferring roller means of the transferring conveyor system and the drive shaft means to transmit rotary power from the drive shaft means to the at least one transferring roller means of the transferring conveyor system.

2. The improved combination of claim 1 wherein said drive shaft means has a structure defining at least one groove means in which the said at least one power take-off endless belt movably passes around the shaft means.

3. The improved combination of claim 2 wherein said pair of guide sheave means and said take-off sheave means are horizontally disposed within said conveyor system.

4. The improved combination of claim 3 wherein said transferring conveyor system comprises a pair of opposed pivot bar means pivotally secured within the conveyor system at their mid-points; a pair of opposed side support means pivotally connected to the ends of the pair of pivot bar means; a plurality of pairs of opposed roller bracket means aligned along the pair of opposed side support means and attached thereto, said transferring roller means rotatably supported by the plurality of pairs of opposed roller bracket means, said at least one of said transferring roller means interconnected to the at least one accessory endless belt and having a structure defining an accessory groove in which the said accessory endless belt movably passes around said transferring roller means; and an air cylinder means having one end fixed within the conveyor system in proximity to one of the ends of one of the pivot bar means and having the other end secured to said pivot bar means in order to pivot when air pressure is applied to the cylinder means the attached pivot bar means about its pivotally secured mid-point such that the opposed pair of pivot bar means and the side supports pivotally connected to the opposed pair of pivot bar means define a parallelogram.

5. The improved combination of claim 4 wherein said conveyor system additionally comprises at least one double grooved roller having a pair of grooves and rotatably secured at one of its ends to one of the support members in proximity to one of the pivot bar means; at least one short roller having a single groove and having one end rotatably secured to one of the support members between the at least one double grooved roller and the pivot bar means, said drive shaft means having a groove situated underneath one of the grooves of the double grooved roller; a roller endless belt means interengaging around one of the grooves of the double grooved roller and the groove of the drive shaft situated underneath thereof in order that rotary power can be extracted from the drive shaft means and transmitted to the double grooved roller; at least one short endless belt means interengaging around the single groove of the short roller and the other vacant groove of the double grooved roller in order that the rotary power of the double grooved roller received from the drive shaft means is transmitted to the short roller.

6. The improved combination of claim 5 wherein at least one of the plurality of carrier rollers of said conveyor system situated over said drive shaft means has a structure defining a carrier groove; said drive shaft means has another groove positioned under said at least one grooved carrier roller; a carrier endless belt interengaging around the groove of the carrier roller and the groove of the drive shaft situated underneath thereof in order that rotary power can be extracted from the drive shaft means and transmitted to the grooved carrier roller.

7. A process for transferring articles to a branch conveyor system from a combined transferring conveyor system having transferring roller means and conveyor system of the type having a plurality of carrier rollers rotatably connected to a pair of support members and a conveyor cable drive means mechanically communicating with the branch conveyor system and the conveyor system including a plurality of idle sheaves rotatably connected underneath the carrier rollers and an endless cable positioned over the plurality of idle sheaves and branch sheaves and engaged to the conveyor cable drive means comprising the steps of:

(a) detouring the generally straight line path of the endless cable by movably passing the endless cable between at least one pair of guide sheaves means and a take-off sheave means positioned therebetween to frictionally pinch the endless cable in order that rotational power is imparted to the take-off sheave means;

(b) at least one drive sheave means with the take-off sheave means rotating concentrically in unison such that the rotary power imparted to the take-off sheave means is simultaneously imparted to the drive sheave means;

(c) positioning rotatably a drive shaft means within the conveyor system underneath the transferring conveyor system;

(d) extracting rotary power from the rotating drive sheave means and imparting the same to the drive shaft means in order to rotate the drive shaft means; and (e) transmitting rotational power from the rotating drive shaft means to the transferring roller means of the transferring conveyor system.

8. The process of claim 7 additionally comprising pivoting the structure of the transferring conveyor system into generally a parallelogram.

9. The process of claim 8 additionally comprising transmitting rotary power from the drive shaft means to at least one of the carrier rollers.

10. The process of claim 9 additionally comprising transmitting rotary power from the drive shaft means to a double grooved roller means rotatably secured to one of said support members in proximity to said transferring conveyor system.

11. The process of claim 10 additionally comprising transmitting rotary power from the double grooved roller to a short single grooved roller rotatably secured to one of said support members between said double grooved roller means and said transferring conveyor system.

* * * * *